US007532210B2

(12) United States Patent
Chen et al.

(10) Patent No.: US 7,532,210 B2
(45) Date of Patent: May 12, 2009

(54) DRIVING METHOD FOR ACTIVE MATRIX LIQUID CRYSTAL DISPLAY PANEL

(75) Inventors: Lomg Kuan Chen, Miao-Li (TW); Eddy G. Chen, Miao-Li (TW); Chih-Sheng Chang, Miao-Li (TW); Sz Hsiao Chen, Miao-Li (TW); Tsau Hua Hsieh, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 690 days.

(21) Appl. No.: 11/311,847

(22) Filed: Dec. 19, 2005

(65) Prior Publication Data

US 2006/0132409 A1 Jun. 22, 2006

(30) Foreign Application Priority Data

Dec. 17, 2004 (TW) .............................. 93139385 A

(51) Int. Cl.
*G06F 3/038* (2006.01)
*G09G 3/36* (2006.01)

(52) U.S. Cl. .......................... 345/208; 345/87; 345/94; 345/204

(58) Field of Classification Search .................. 345/55, 345/76, 77, 84, 87, 89, 90, 92, 94, 95, 204, 345/208, 210, 690
See application file for complete search history.

(56) References Cited

U.S. PATENT DOCUMENTS

| | | | | |
|---|---|---|---|---|
| 5,495,265 | A | 2/1996 | Hartman et al. | |
| 5,594,464 | A * | 1/1997 | Tanaka et al. | 345/94 |
| 5,815,134 | A * | 9/1998 | Nishi | 345/97 |
| 6,061,044 | A * | 5/2000 | Ohno et al. | 345/95 |
| 6,903,716 | B2 * | 6/2005 | Kawabe et al. | 345/99 |
| 7,030,848 | B2 * | 4/2006 | Sato et al. | 345/95 |
| 2003/0169247 | A1 * | 9/2003 | Kawabe et al. | 345/204 |
| 2005/0219188 | A1 * | 10/2005 | Kawabe et al. | 345/94 |

* cited by examiner

*Primary Examiner*—My-Chau T Tran
(74) *Attorney, Agent, or Firm*—Wei Te Chung

(57) ABSTRACT

A driving method for an active matrix liquid crystal display panel includes the following steps. First, a frame period is divided into a display period ($t_1$) and a black insertion period ($t_r$). A gray-scale voltage is generated according to a desired corresponding light transmittance of each pixel of the liquid crystal display panel; and during the display period, the gray-scale voltage is supplied to a corresponding pixel electrode of the liquid crystal display panel. Then during the black insertion period, a restoring voltage $V_h$ is supplied to the pixel electrode, so that the pixel is returned to an initial black state. Accordingly, the quality of motion pictures of the liquid crystal display panel is good.

7 Claims, 4 Drawing Sheets

DRIVING METHOD FOR ACTIVE MATRIX LIQUID CRYSTAL DISPLAY PANEL

BACKGROUND OF THE INVENTION

1. Field of the Invention

The present invention relates to a driving method of an active matrix liquid crystal display panel, and particularly to a method for driving an active matrix liquid crystal display panel that can provide displaying of clear images.

2. General Background

Liquid crystal display (LCD) panels that are lightweight, thin and portable are widely used in consumer products such as LCD-TVs, notebooks, desktop computers, mobile phones and personal digital assistants (PDAs). The application of LCD panels in the market is becoming more and more important. However, liquid crystal molecules used in LCD panels are sticky. This means that the response time of the liquid crystal molecules of an LCD panel is far inferior to that of an electron gun in a conventional cathode ray tube (CRT) display. In addition to switching the active switching elements, the response time of an LCD panel must generally be shorter than 16.7 ms (milliseconds). Otherwise, the quality of a motion picture displayed by the LCD panel and viewed by the human eye may be very poor.

FIG. 3 schematically illustrates certain parts of a conventional active matrix liquid crystal display panel 100. The active matrix liquid crystal display panel 100 includes n rows of parallel scan lines 101, and m columns of parallel data lines 102 orthogonal to the n rows of parallel scan lines 101. The active matrix liquid crystal display panel 100 also includes a plurality of thin-film transistors (TFTs) 104, which function as switching elements to drive corresponding pixel electrodes 103. Each of the TFTs 104 is positioned near where a corresponding scan line 101 and corresponding data line 102 cross. A gate electrode 1040 of the TFT 104 is electrically coupled to the scan line 101, and a source electrode 1041 of the TFT 104 is electrically coupled to the data line 102. Further, a drain electrode 1042 of the TFT 104 is electrically coupled to the pixel electrode 103. Each scan line 101 includes m pixel electrodes 103, and each pixel electrode 103 and a respective common electrode 105 cooperatively form a capacitor 107.

Reference is made to FIGS. 4A, 4B, and 4C. FIG. 4A illustrates a waveform diagram of voltage supplied to the gate electrode 1040 of one TFT 104. FIG. 4B illustrates a waveform diagram of voltage supplied to the source electrode 1041 of the TFT 104. FIG. 4C illustrates a waveform diagram of voltage of the pixel electrode 103 of the TFT 104.

During the first frame, e.g. a period between $t_1$ and $t_3$, a gate electrode driving device (not shown) supplies a scanning voltage $V_g$ to drive the gate electrode 1040 of the TFT 104. After the TFT 104 is turned on, a source electrode driving device (not shown) supplies a gray scale voltage $V_d$ to the pixel electrode 103 through the source electrode 1041 and the drain electrode 1042 of the TFT 104. Thereby, the pixel electrode 103 is charged to a voltage $V_{p1}$ while the gray scale voltage $V_d$ is maintained. When t is equal to $t_2$, the TFT 104 is turned off by turning off the supply of the scanning voltage $V_g$, whereupon the capacitor 107 maintains the voltage $V_{p1}$ until the TFT 104 is turned on at $t=t_3$.

Similarly, during the second frame, when t is equal to $t_3$, the scanning voltage $V_g$ is supplied to drive the TFT 104. The pixel electrode 103 is charged to a voltage $V_{p2}$ while the gray scale voltage $V_d$ is maintained. At $t=t_4$, the TFT 104 is turned off by turning off the supply of the scanning voltage $V_g$, whereupon the capacitor 107 maintains the voltage $V_{p2}$.

Because liquid crystal molecules used in the active matrix liquid crystal display panel 100 are sticky, the pixel electrode 103 cannot be charged to the required gray voltage within one frame period of 16.7 ms, and the liquid crystal molecules do not complete their transition to the new alignment in time. As a result, an afterimage of this current frame is perceived on the retina of a viewer's eye, so that the viewer's perception of the image of the next frame will be affected by the afterimage of the current frame. Thus the active matrix liquid crystal display panel 100 fails to provide clear images.

U.S. Pat. No. 5,495,265 entitled "Fast response electro-optic display device" discloses a conventional overdrive method to overcome blurred images. The method relates to an inter-gray response and a look-up table. Data of the look-up table is an overdrive voltage applied to the pixel electrode in order to reduce the response time of the liquid crystal molecules. The overdrive gray-scale voltage is dependent on the previous frame gray scale and subsequent frame gray scale, so that it takes less than 16.7 ms to change the brightness of the pixels between different gray scales. When the levels of gray scales are increased, the data is interpolated by the gray-scale voltages between the previous frame and the subsequent frame of the look-up table. The number of data is increased in geometric series. For example, if the level of gray scale is 8 digits, the size of the look-up table used to store these data should have 8×8=64 digits. That is, the higher the number of gray scales, the larger the size of the look-up table. If the size of the look-up table is increased, the cost of the device is also higher. In some cases, a smaller-sized look-up table can be used, or associated hardware can be implemented to replace the look-up table. However, with these alternative configurations, the performance of the device is not optimal.

Therefore, there is a need for a method for driving an active matrix liquid crystal display panel that can display clear images efficiently.

SUMMARY

A method for driving an active matrix liquid crystal display panel that can display clear images is provided.

Dada signals are supplied to a plurality of pixel electrodes of the liquid crystal display panel so that corresponding pixels display images. The steps of the driving method are as follows. First, a frame period is divided into a display period and a black insertion period. A gray-scale voltage is generated so that a corresponding light transmittance of each pixel is determined; and during the display period, the gray-scale voltage is supplied to the corresponding pixel electrode of the liquid crystal display panel. Then, during the black insertion period, a restore voltage is supplied to the pixel electrode so that the state of the pixel is returned to an initial black state.

Unlike in the prior art, the above-described method supplies the restore voltage to the pixel electrode so that the pixel is returned to the black state before the subsequent frame period begins. Thus the pixel is in the black state before the pixel displays an image corresponding to the subsequent frame period. Accordingly, from a viewer's perception, the image of the previous frame period has no adverse impact on the image of the subsequent frame period. That is, images displayed by the liquid crystal display panel are clear and smooth.

Other advantages and novel features of embodiments of the present invention will become more apparent from the following detailed description when taken in conjunction with the accompanying drawings, in which:

DETAILED DESCRIPTION OF PREFERRED EMBODIMENTS

The following detailed description is of the best presently contemplated modes of carrying out the invention. This description is not to be taken in a limiting sense, but is made merely for the purpose of illustrating general principles of embodiments. The scope is defined by the appended claims and equivalents thereof.

Figure 1:
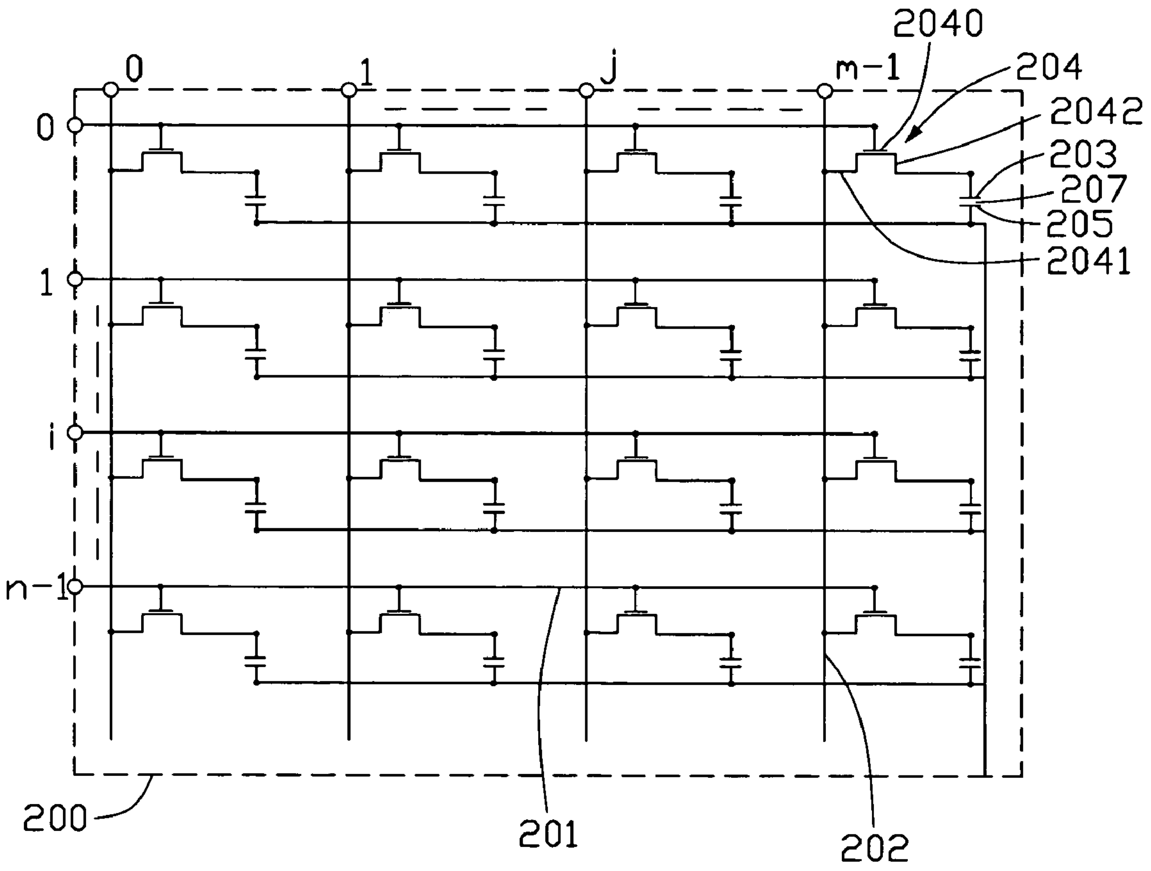
FIG. 1 is a schematic, abbreviated diagram of certain parts of an active-matrix liquid crystal display panel according to an exemplary implementation of the present invention.

FIG. 1 shows certain parts of an active matrix liquid crystal display panel (hereinafter referred to as a liquid crystal display panel) 200, which is used as an exemplary apparatus for illustrating implementation of an exemplary driving method according to the present invention. The liquid crystal display panel 200 includes n rows of parallel scan lines 201 and m columns of parallel data lines 202. The data lines 202 are electrically insulated from and perpendicular to the scan lines 201. The liquid crystal display panel 200 further includes a plurality of thin-film transistors (TFTs) 204, which function as switching elements to drive respective pixel electrodes 203. Each of the TFTs 204 is positioned in the vicinity of the crossover of a corresponding scan line 201 and a corresponding data line 202. A gate electrode 2040 of the TFT 204 is electrically coupled to the scan line 201, and a source electrode 2041 of the TFT 204 is electrically coupled to the data line 202. Further, a drain electrode 2042 of the TFT 204 is electrically coupled to the pixel electrode 203. Each scan line 201 includes m pixel electrodes 203, and each pixel electrode 203 and a respective counter electrode 205 cooperatively form a capacitor 207.

Figure 2A:
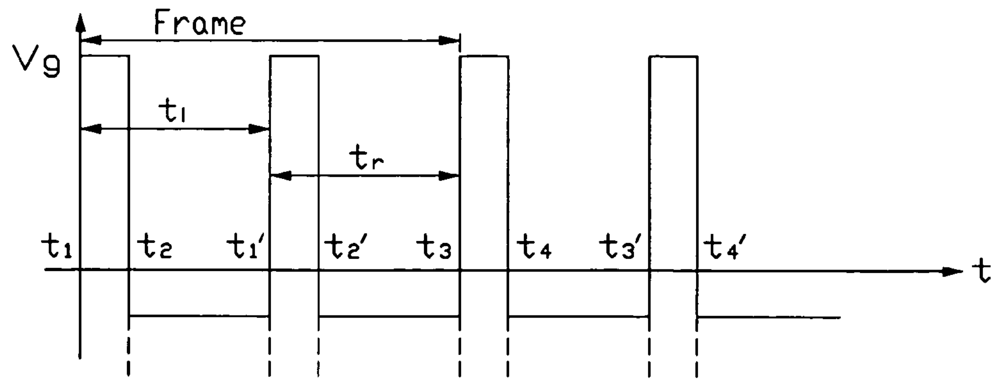
FIG. 2A is a waveform diagram of voltage supplied to a gate line of the liquid crystal display of FIG. 1.
Figure 2B:
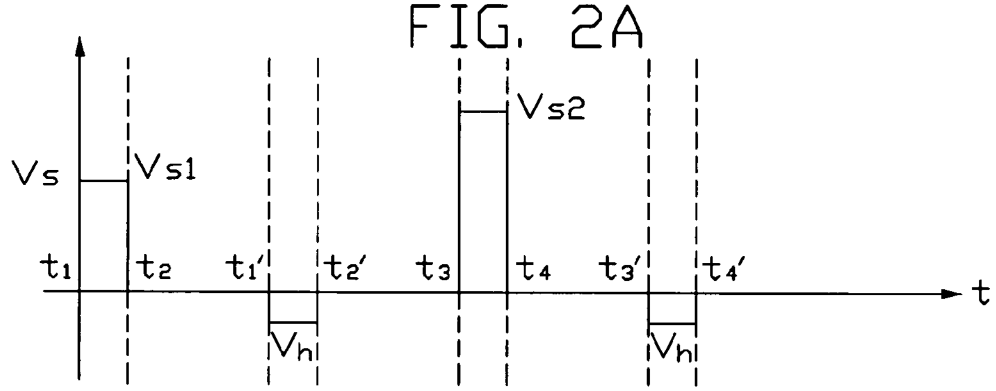
FIG. 2B is a waveform diagram of voltage supplied to a data line of the liquid crystal display of FIG. 1.
Figure 2C:
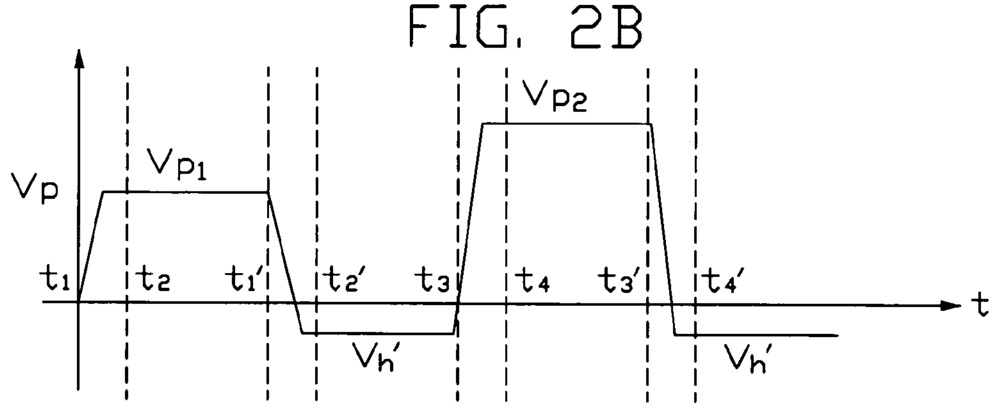
FIG. 2C is a waveform diagram of voltage of a pixel electrode of the liquid crystal display of FIG. 1.
Figure 2D:
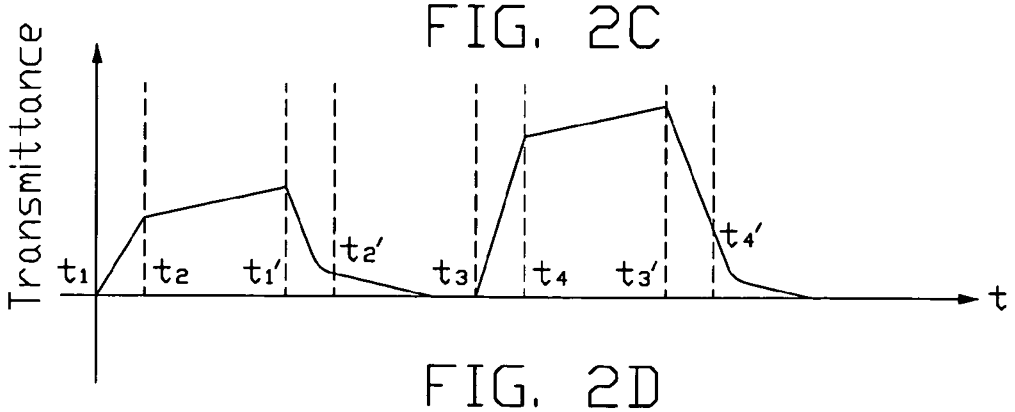
FIG. 2D is a waveform diagram of light transmittance of the liquid crystal display of FIG. 1.
Figure 3:
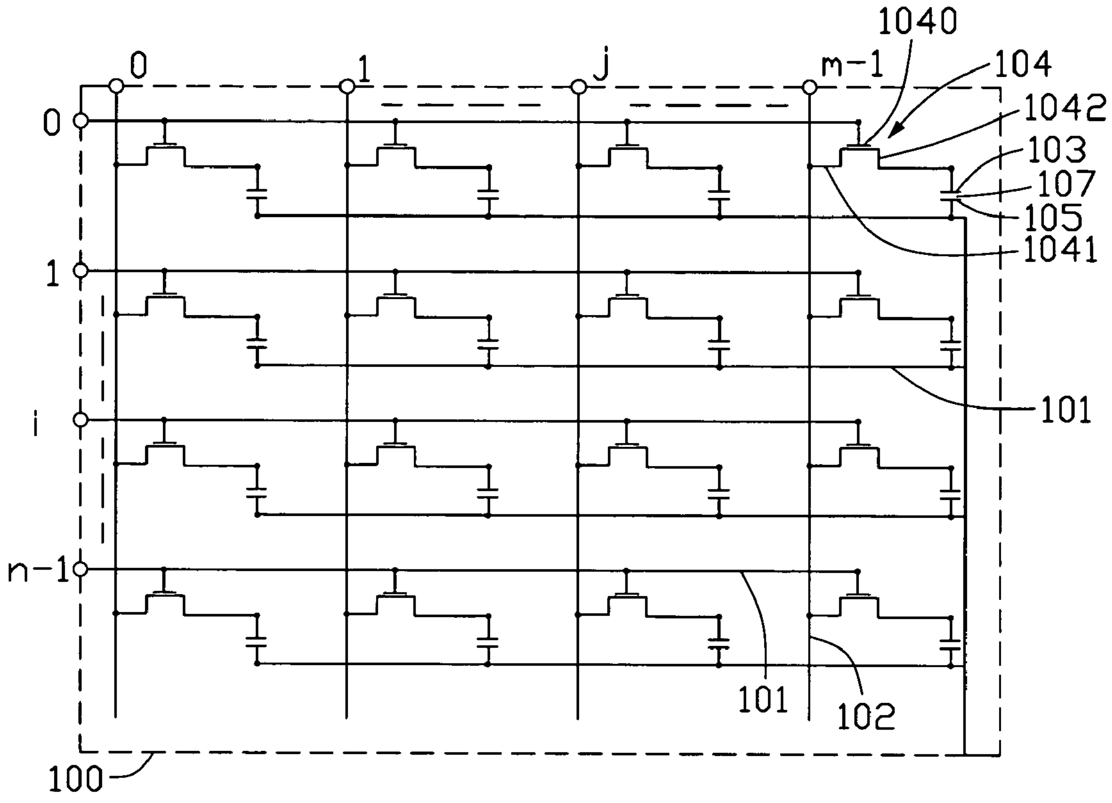
FIG. 3 (PRIOR ART)
FIG. 3 is a schematic, abbreviated diagram of certain parts of an active-matrix liquid crystal display panel of the prior art.
Figure 4A:
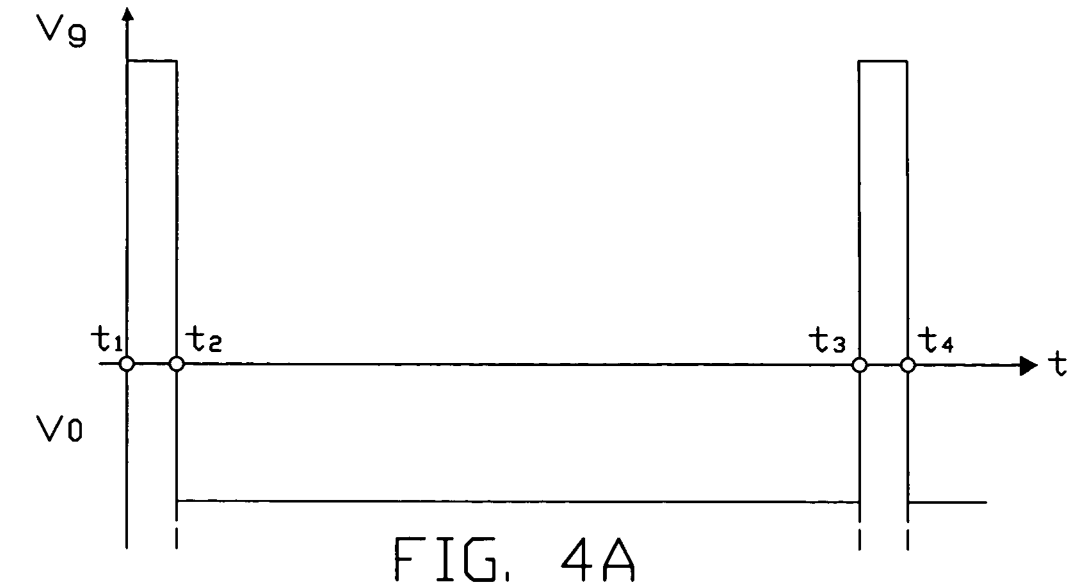
FIG. 4A (PRIOR ART)
FIG. 4A is a waveform diagram of voltage supplied to a gate line of the liquid crystal display of FIG. 3.
Figure 4B:
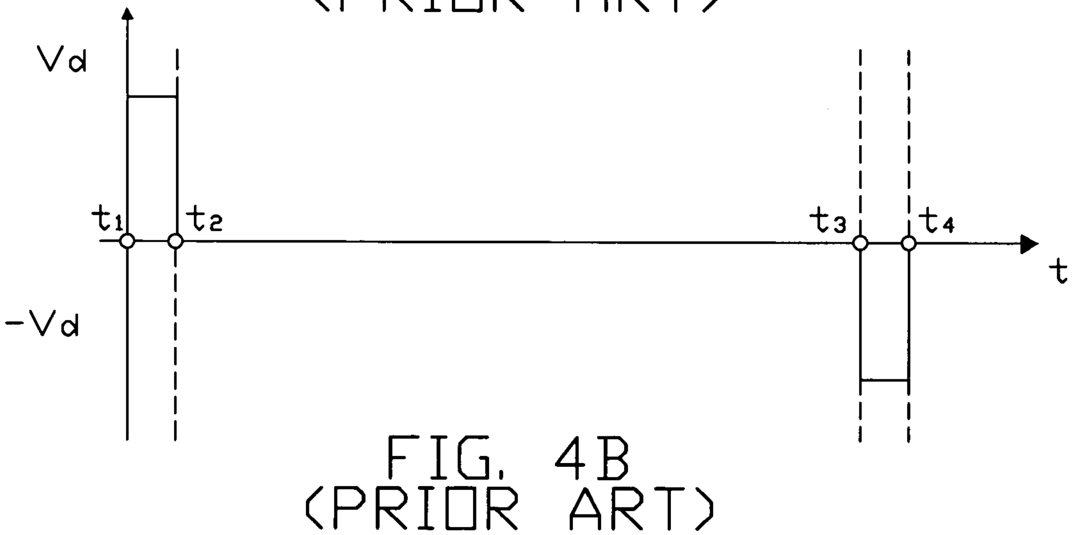
FIG. 4B (PRIOR ART)
FIG. 4B is a waveform diagram of voltage supplied to a data line of the liquid crystal display of FIG. 3.
Figure 4C:
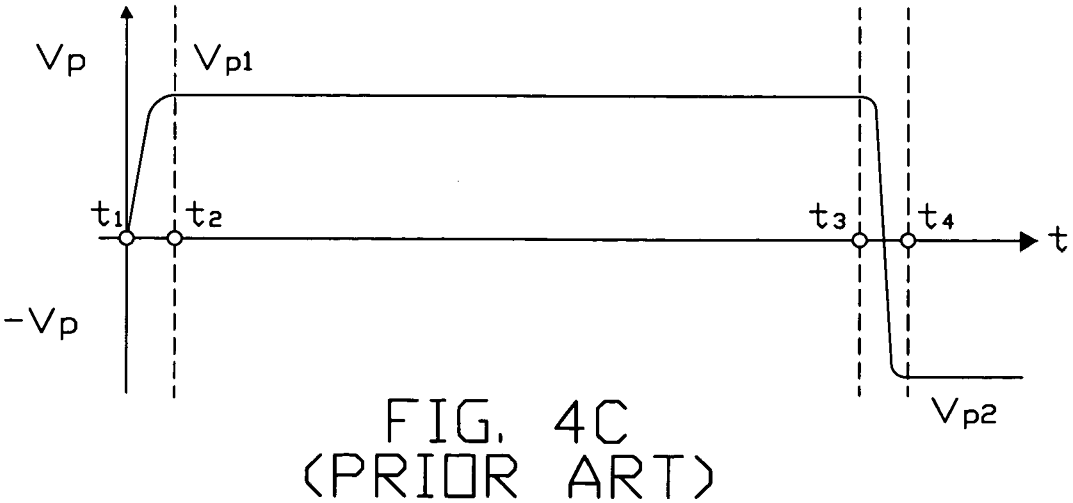
FIG. 4C (PRIOR ART)
FIG. 4C is a waveform diagram of voltage of a pixel electrode of the liquid crystal display of FIG. 3.

FIGS. 2A-2D illustrate voltage and light transmittance characteristics relating to driving the liquid crystal display panel 200 according to the exemplary driving method. FIG. 2A illustrates voltage waveforms of the gate electrode 2040 of the TFT 204. FIG. 2B illustrates voltage waveforms of the source electrode 2041 of the TFT 204. FIG. 2C illustrates voltage waveforms of the pixel electrode 203 of the TFT 204. FIG. 2D illustrates a waveform of light transmittance of the liquid crystal display panel 200.

During a display period ($t_i$) of the first frame period, a gate electrode driving device (not shown) supplies a scan voltage $V_g$ to drive the gate electrode 2040 of the TFT 204 at time $t_1$. Thereby, the TFT 204 is turned on. In addition, a source electrode driving device (not shown) supplies a gray-scale voltage $V_{s1}$ to the pixel electrode 203 through the source electrode 2041 and the drain electrode 2042. The pixel electrode 203 is charged to a voltage $V_{p1}$ because of the gray-scale voltage $V_{s1}$ supplied. When the scan voltage $V_g$ is turned off to turn off the TFT 204 at time $t_2$, the capacitor 207 maintains the voltage $V_{p1}$ of the pixel electrode 203. During a black insertion (hereinafter referred to as "BI") period ($t_r$) of the first frame period, the scan voltage $V_g$ is used to drive the gate electrode 2040 of the TFT 204 so that the TFT 204 is turned on again. In addition, the source electrode driving device supplies a restoring voltage $V_h$ to the pixel electrode 203 through the source electrode 2041 and the drain electrode 2042. The pixel electrode 203 is charged to a restored voltage $V_h'$ because of the restoring voltage $V_h$ supplied. When the scan voltage $V_g$ is turned off to turn off the TFT 204 at time $t_2'$, the capacitor 207 maintains the restored voltage $V_h'$. Accordingly, the pixel is returned to an initial black state.

Similarly, during the display period ($t_i$, not labeled) of the second frame period (not labeled), the gate electrode driving device supplies a scan voltage $V_g$ to drive the gate electrode 2040 of the TFT 204 at time $t_3$. Thereby, the TFT 204 is turned on. In addition, the source electrode driving device (not shown) supplies a gray-scale voltage $V_{s2}$ to the pixel electrode 203 through the source electrode 2041 and the drain electrode 2042. The pixel electrode 203 is charged to a voltage $V_{p2}$ because of the gray-scale voltage $V_{s2}$ supplied. When the scan voltage $V_g$ is turned off to turn off the TFT 204 at time $t_4$, the capacitor 207 maintains the voltage $V_{p2}$ of the pixel electrode 203. During the BI period ($t_r$, not labeled) of the second frame period, the scan voltage $V_g$ is used to drive the gate electrode 2040 of the TFT 204 so that the TFT 204 is turned on again. In addition, the source electrode driving device supplies a restoring voltage $V_h$ to the pixel electrode 203 through the source electrode 2041 and the drain electrode 2042. The pixel electrode 203 is charged to a restored voltage $V_h'$ because of the restoring voltage $V_h$ supplied. When the scan voltage $V_g$ is turned off to turn off the TFT 204 at time $t_4'$, the capacitor 207 maintains the restored voltage $V_h'$. Accordingly, the pixel is returned to its initial black state.

Referring to FIG. 2D, each frame period is immediately subsequent to a black state of the pixel at the end of the previous frame period. Therefore from a viewer's perception, the image of the previous frame period has no adverse impact on the image of the subsequent frame period. That is, images displayed by the liquid crystal display panel 200 according to the exemplary driving method are clear and smooth.

The steps of the above-described exemplary driving method can be summarized as follows. First, a frame period is divided into a display period $t_i$ and a BI period $t_r$. A gray-scale voltage $V_s$ is generated so as to provide a corresponding desired light transmittance of the pixel; and during the display period $t_i$, the gray-scale voltage $V_s$ is supplied to the pixel electrode 203 of the liquid crystal display panel 200. Then during the BI period $t_r$, a restoring voltage $V_h$ is supplied to the pixel electrode 203, so that the pixel is returned to an initial black state.

According to the exemplary driving method, the ratio of the display period $t_i$ to the BI period $t_r$ can be equal to one (1), more than one, or less than one. The resolution of the gray scale voltage can be 8 levels, 16 levels, 32 levels, or 64 levels. The gray-scale voltage can be obtained from 64-level formats of a transmittance-voltage (T-V) curve.

Furthermore, according to the exemplary driving method, only the response of the gray-scale voltage from the initial black state needs to be measured. That is, only the response of the gray-scale voltage $V_s$ against the pixel electrode needs to be considered. Measurement of the inter-gray response of the gray-scale voltage $V_s$ and a setup of a corresponding look-up table are simplified. Compared with the prior art, the exemplary driving method re-defines the gray-scale voltage $V_s$. During the BI period, the restoring voltage $V_h$ is supplied to the pixel electrodes of the liquid crystal display panel, so that each pixel is returned to its initial black state before the subsequent frame period begins. At the moment each gray-scale voltage is supplied, liquid crystal molecules of the liquid crystal display panel are oriented in a position corresponding to the black state. That is, before each pixel displays an image, the pixel is in an initial black state. Accordingly, from a viewer's perception, the image of a previous frame period does not have an adverse impact on the image of a subsequent frame period. This means that the quality of motion pictures provided by the liquid crystal display panel is good.

It is to be further understood that even though numerous characteristics and advantages of the embodiments have been set forth in the foregoing description, together with details of the functions of the embodiments, the disclosure is illustrative only, and changes may be made in detail, especially in matters of arrangement of steps to the full extent indicated by the broad general meaning of the terms in which the appended claims are expressed.

We claim:

1. A driving method for an active matrix liquid crystal display panel, in which data signals are supplied to a plurality of pixel electrodes of the liquid crystal display panel in order to display images via pixels associated with the pixel electrodes, the method including the steps of:

dividing a frame period into a display period and a black insertion period;

generating a gray-scale voltage corresponding to a desired light transmittance of each pixel;

supplying the gray-scale voltage to the pixel electrode during the display period; and supplying a restore voltage to the pixel electrode during the black insertion period so that the corresponding pixel is returned to an initial black state.

2. The driving method as claimed in claim 1, wherein a ratio of the display period to the black insertion period is equal to one.

3. The driving method as claimed in claim 1, wherein a ratio of the display period to the black insertion period is more than one.

4. The driving method as claimed in claim 1, wherein a ratio of the display period to the black insertion period is less than one.

5. The driving method as claimed in claim 1, wherein the frame period is approximately 16.7 ms.

6. The driving method as claimed in claim 1, wherein a resolution of the gray-scale voltage is 8 levels, 16 levels, 32 levels, or 64 levels.

7. A driving method for an active matrix liquid crystal display panel, in which data signals are supplied to a plurality of pixel electrodes of the liquid crystal display panel in order to display images via pixels associated with the pixel electrodes, the method including the steps of:

configuring a frame period into at least a display period and a black insertion period;

supplying a gray-scale voltage to the pixel electrode during the display period; and supplying a restore voltage to the pixel electrode during the black insertion period so that the corresponding pixel is returned to an initial black state.

* * * * *